No. 857,830. PATENTED JUNE 25, 1907.
F. K. RAND & W. R. HINES.
WHEEL RIM.
APPLICATION FILED FEB. 20, 1906.

2 SHEETS—SHEET 1.

WITNESSES:
W. H. Durand
Geo. E. Few

INVENTORS
Frederick K. Rand
and William R. Hines
By Milo B. Stevens & Co.
Attorneys No. 857,830. PATENTED JUNE 25, 1907.
F. K. RAND & W. R. HINES.
WHEEL RIM.
APPLICATION FILED FEB. 20, 1906.
2 SHEETS—SHEET 2.
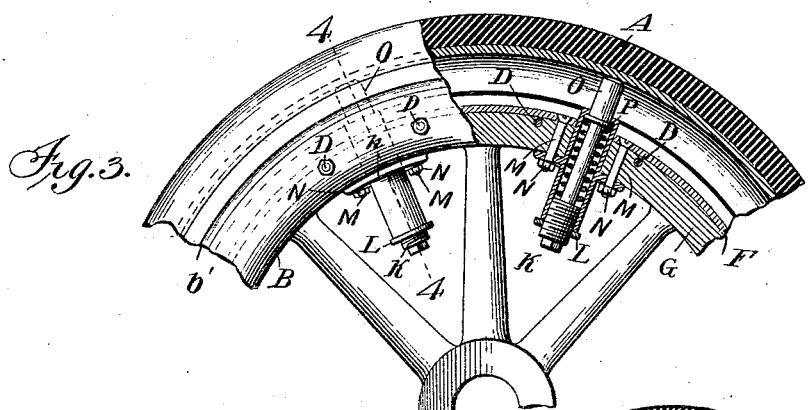
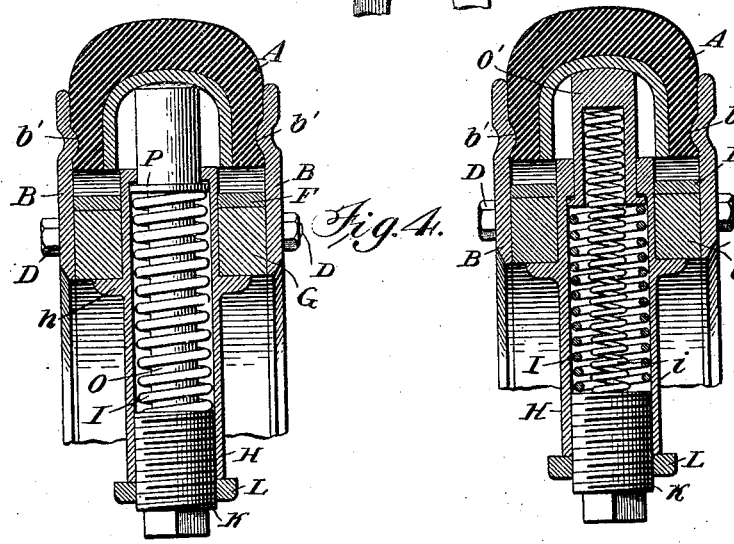
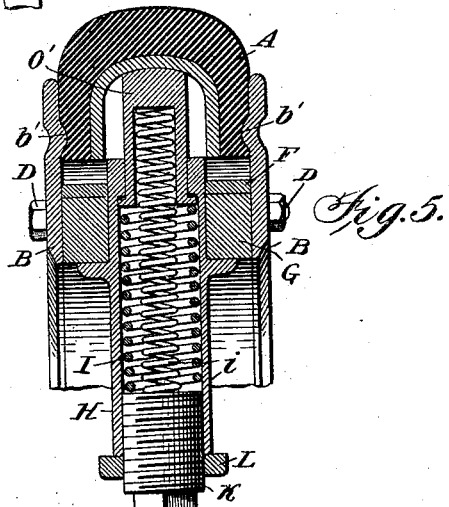
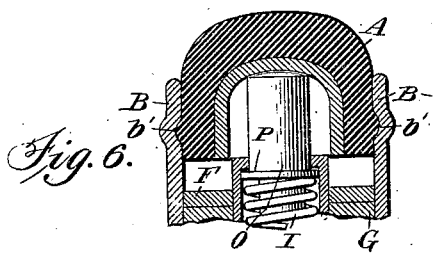
WITNESSES:
W. H. Durand
Geo. E. Few
INVENTORS
Frederick K. Rand
and William R. Hines
BY Milo B. Stevens & Co.
Attorneys

UNITED STATES PATENT OFFICE.

FREDERICK K. RAND AND WILLIAM R. HINES, OF CLEVELAND, OHIO.

WHEEL-RIM.

No. 857,830. Specification of Letters Patent. Patented June 25, 1907.

Application filed February 20, 1906. Serial No. 302,062.

*To all whom it may concern:*

Be it known that we, FREDERICK K. RAND and WILLIAM R. HINES, citizens of the United States, residing at Cleveland, in the county of Cuyahoga and State of Ohio, have invented new and useful Improvements in Wheel-Rims, of which the following is a specification.

This invention is a cushion tire for vehicle wheels, and it embodies in its construction a rubber tire which is supported by springs mounted in casings in the rim of the wheel and bearing on the under side of the tire.

The object of the invention is to provide a tire of more resiliency than when rubber alone is used.

A further object of the invention is to provide a tire supported by springs which can be adjusted to vary the tension when the wheel is in action, and this can be done without bringing any increased strain on the rubber tire.

Further objects and improvements in construction will be apparent from the following description.

Figure 1:
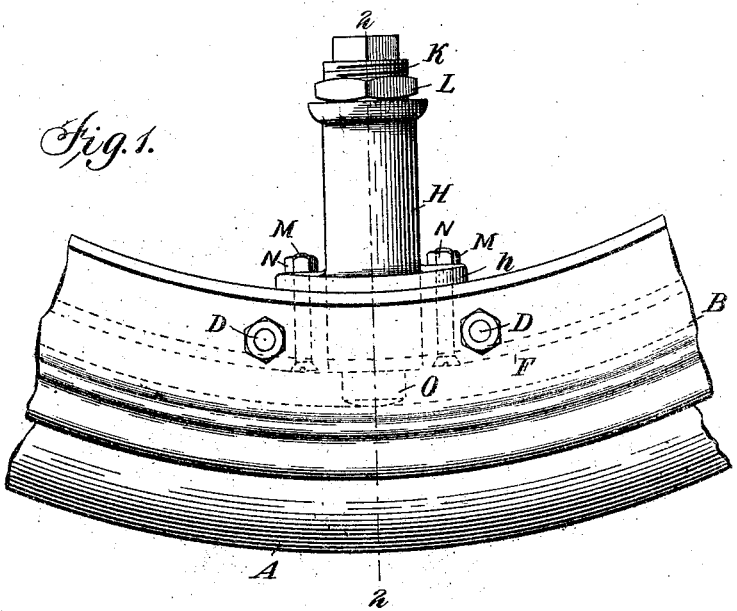
Figure 2:
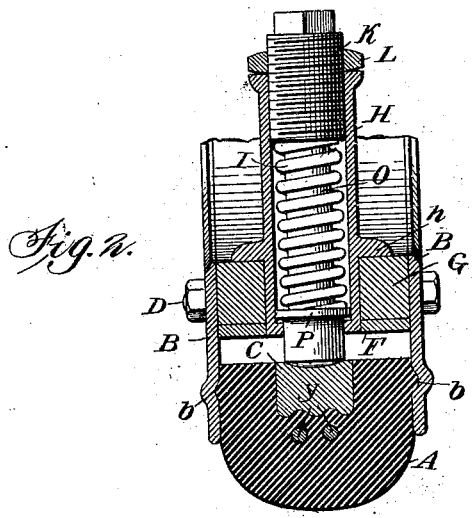

In the accompanying drawings, Figure 1 is an elevation of a part of a wheel rim provided with the improvement. Fig. 2 is a section thereof on the line 2—2 of Fig. 1. Fig. 3 is a partial plan and longitudinal section of a modification. Fig. 4 is a section on the line 4—4 of Fig. 3. Figs. 5 and 6 are sections of other modifications.

Referring specifically to the drawings, A indicates a solid rubber tire which is placed between side rings B which are secured to the wheel felly G by bolts D. In the forms shown in Figs. 1 and 2 this tire is provided with a steel ring C and tire wires Y embedded therein.

F indicates the metal rim upon the felly, extending between the side rings B.

H indicates tubular casings the outer ends of which extend through the felly G and rim F, and these casings are secured in place by means of bolts M and nuts N which extend through flanges $h$ on the casings and through the wheel felly and rim. The inner end of the tubular casing H is threaded to receive a threaded plug K by means of which the tension is adjusted, and this plug is provided with a lock nut L to hold it as set.

O indicates a plunger the head of which extends through a hole in the outer end of the casing H and the shank of which extends into a guide bore in the inner end of the plug K. The spring I is coiled around the shank of the plunger between the plug and the head of the plunger, and said plunger has a shoulder P which stops against a shoulder formed at the outer end of the casing.

The metal ring C rests upon the outer ends of the series of plungers located around the rim of the wheel, and the compression incident to the weight or movement of the vehicle causes the plungers to retract and the tire to yield accordingly.

In the form shown in Figs. 3 and 4 the rubber tire A is hollow, and instead of the ring C and wires Y it is provided with an inner ring of channeled metal U-shape in cross section, and the plungers O are in contact with the bottom of the channel. This is lighter and cheaper than a solid rubber tire, and nevertheless does not alter the shape of the tread.

In the form shown in Fig. 5 double springs are provided, the plunger O' being without the shank, and provided with a heavy outer spring I, the same as the spring above referred to, and also with an inner spring $i$, the outer end of which fits in a bore in the plunger.

In the forms shown in the foregoing figures the rubber tire and the retaining rings B are provided with longitudinal ribs and grooves. In the forms shown in Figs. 1 and 6 the side plates B are provided on their inner sides with grooves, and the tire has a rib $b$ which fits in said grooves. In the forms shown in Figs. 3, 4 and 5, the grooves are in the tire and the ribs $b'$ project inwardly from the rings. These ribs and grooves assist in preventing any slip of the rubber tire and also make the parts water and dust tight so that dirt will not collect in the space between the tire and the felly.

Any tension desired can be put on the plungers, by suitable adjustment of the plugs K, and it is to be noticed that the contact of the shoulders P against the end of the casings H acts as a stop for the plungers and relieves the rubber of the pressure when the vehicle is not in use, and when in use the pressure is entirely on the plungers on the lower half of the wheel, the pressure on the upper half being relieved.

In addition to forming a water-tight joint and assisting in preventing any longitudinal slip of the tire, the ribs $b$ above referred to also assist in preventing any radial slip of the tire. The ribs and grooves hold the sides of the tire stationary or fixed, but allow the middle part of the tire to yield up and down with the springs, producing a sort of "roll" of the tire from the sides toward the middle, which in combination with the spring gives a resiliency which approaches much nearer that of a pneumatic tire than any arrangement of either spring or rubber alone would produce.

We claim:

1. A wheel rim comprising a felly having a series of tubular casings extending therethrough, plungers movable in and out in the casings, springs behind the plungers, adjusting plugs screwed into the inner ends of the casings against the springs, a rubber tire having a channeled metal ring thereunder which rests on the outer ends of the plungers, and retaining rings secured to each side of the felly and extending beside the tire.

2. A wheel rim having thereon a rubber tire provided on its inner side with a metal ring embedded therein, spring supported plungers bearing against said ring, and retaining rings secured to opposite sides of the wheel felly and extending out beside the tire and clamping the sides thereof against the ring, the retaining rings and tire having respectively a longitudinal groove and a rib fitting therein, on their adjacent surfaces.

3. A wheel rim having a series of spring supported radial plungers therein, a cushion tire mounted on the outer ends of the plungers and having embedded therein an inner ring of channeled metal against which the plungers bear.

In testimony whereof we have signed our names to this specification in the presence of two subscribing witnesses.

FREDERICK K. RAND.
WILLIAM R. HINES.

Witnesses:
JOHN A. BOMMHARDT,
SHIRLEY BOMMHARDT.